United States Patent
Hess et al.

(10) Patent No.: US 12,391,408 B2
(45) Date of Patent: Aug. 19, 2025

(54) MANNED SPACE STATION WITH SOLID STRUCTURE

(71) Applicant: Airbus Defence and Space GmbH, Taufkirchen (DE)

(72) Inventors: Marc Peter Hess, Taufkirchen (DE); Dean Robert Mosseveld, Taufkirchen (DE); Torsten Vogel, Taufkirchen (DE); Günther Dorst, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 160 days.

(21) Appl. No.: 17/992,201

(22) Filed: Nov. 22, 2022

(65) Prior Publication Data
US 2024/0150042 A1    May 9, 2024

(30) Foreign Application Priority Data
Nov. 4, 2022  (EP) .................................... 22205607

(51) Int. Cl.
*B64G 1/12* (2006.01)
*B64G 1/22* (2006.01)

(52) U.S. Cl.
CPC .............. *B64G 1/12* (2013.01); *B64G 1/223* (2023.08)

(58) Field of Classification Search
CPC ............ B64G 1/12; B64G 1/223; B64G 1/60
See application file for complete search history.

(56) References Cited

U.S. PATENT DOCUMENTS

| | | | | |
|---|---|---|---|---|
| 3,210,026 A | * | 10/1965 | Frisch ...................... | B64G 1/12 244/159.4 |
| 4,132,373 A | * | 1/1979 | Lang ........................ | B64G 1/12 414/427 |
| 5,441,221 A | | 8/1995 | Wade et al. | |
| 6,216,984 B1 | * | 4/2001 | Brinsmade ............... | B64G 1/12 244/159.4 |

(Continued)

OTHER PUBLICATIONS

Extended European Search Report including Written Opinion for Application No. 22205607.9 dated Apr. 4, 2023, pp. 1-10.

(Continued)

*Primary Examiner* — Kimberly S Berona
*Assistant Examiner* — Nevena Aleksic
(74) *Attorney, Agent, or Firm* — Lerner David LLP

(57) ABSTRACT

A space station includes a housing that defines an interior space. An inner chamber is located in the interior space and defines an inner cavity that is sealable from the remainder of the interior space. At least one bulkhead is arranged in the interior space to partition the interior space into at least two compartments that are hermetically sealable from one another. One compartment can be accessed from another compartment via the inner cavity of the inner chamber. The inner cavity is sealable against each compartment. Openings in an outer surface of the housing enable crew members to leave a damaged compartment through the opening. Thus, alternative routes exist to leave a damaged compartment, i.e., either through the inner cavity or through the opening in the outer surface of the housing. When one compartment is damaged, the adjacent compartments are still operative because they are sealed from the damaged compartment.

14 Claims, 2 Drawing Sheets

(56) References Cited

U.S. PATENT DOCUMENTS

| | | | |
|---|---|---|---|
| 2002/0074457 A1* | 6/2002 | Barutt | B64G 1/12 244/171.9 |
| 2010/0051751 A1* | 3/2010 | Mueller | B64G 1/14 244/158.9 |
| 2014/0124627 A1 | 5/2014 | Clay | |
| 2017/0197737 A1 | 7/2017 | Dharmaraj et al. | |

OTHER PUBLICATIONS

Valle, Gerard D. et al: "System Integration Comparison Between Inflatable and Metallic Spacecraft Structures", 2019 IEEE Aerospace Conference, IEEE, Mar. 2, 2019 (Mar. 2, 2019), pp. 1-14, XP033561829.

International Search Report including Written Opinion for Application No. PCT/EP2023/080100 mailed Feb. 4, 2024. 16 pages.

Communication pursuant to Article 94(3) EPC for European Application No. 22205607.9 dated Apr. 10, 2025. 8 pages.

* cited by examiner

MANNED SPACE STATION WITH SOLID STRUCTURE

FIELD OF THE INVENTION

The description relates to a space station for outer space missions, especially to the structural design of a space station for manned outer space missions.

BACKGROUND OF THE INVENTION

Space stations are typically designed to meet several requirements. Manned space stations require life-supporting systems to enable a crew to live in the space station for a certain time. Furthermore, space stations need to withstand external threats in outer space, like high-energetic radiation and meteorite impacts, for example. Additionally, the space station needs to provide space for technical equipment and devices that are required for the outer space mission.

Manned space stations need to meet several safety relevant criteria. For example, in case of damage or danger, the crew needs to be able to leave a damaged module and access a still operative module which provides life-support like an atmosphere, heating, etc.

These requirements all typically result in a complex structure of a space station.

BRIEF SUMMARY OF THE INVENTION

It may be seen as an object to provide a space station for manned outer space missions with reduced structural complexity. This object is solved by the subject matter of the independent claims.

A space station according to the features of the independent claim is provided. Further developments can be derived from the dependent claims and from the following description.

According to an aspect, a space station for manned outer space missions is provided. The space station comprises a housing that forms an interior space which is sealable against an external surrounding environment of the housing, at least one bulkhead arranged within the housing, and an inner chamber arranged within the housing. The housing comprises an outer surface, a first axial end face, and a second axial end face. The first axial end face is arranged opposite the second axial end face, and the outer surface extends from the first axial end face to the second axial end face along a longitudinal axis of the housing. The at least one bulkhead is arranged in the housing such that the at least one bulkhead partitions the interior space into at least two compartments that are sealed from each other by the at least one bulkhead. The inner chamber comprises a wall that encircles an inner cavity, and the inner chamber extends within the housing such that it adjoins each of the at least two compartments. The wall of the inner chamber comprises multiple openings, wherein at least one opening of the multiple openings is assigned to each of the at least two compartments, respectively, and wherein each opening of the multiple openings is sealable against the respective one of the at least two compartments.

In the context of the present description, the outer space is a region out of the earth's atmosphere about 200 km above the surface of the earth. The space station is configured and designed for manned missions that take place in outer space. Thus, the space station includes workspaces, crew rest spaces, life support systems, and protects a human crew from risks and dangers in outer space, like high energetic particles from the sun, loss of atmosphere and pressure, meteorite impacts, etc.

The space station may be prepared for missions in an orbit of the earth or for space missions that include travelling to other locations away from the earth.

The housing encircles the interior space. The interior space is the volume which is available for the crew and any instruments aboard the space station. The interior space is sealed against the outer space. Preferably, the interior space is hermetically sealed in a manner to prevent exchange of atmosphere between the interior space and the surroundings of the space station. However, it should be understood that the housing comprises openings that can be closed (in a sealed manner) and opened so that the crew can enter and leave the interior space as well as devices and instruments can be brought in and out of the interior space for equipping the space station. For this purpose, hatches may be provided at the outer surface and/or at the first and/or second axial end face.

The at least one bulkhead extends in the interior space and partitions or separates the interior space into two compartments that are sealed, preferably hermetically sealed, against each other. Thus, the two compartments form two spaces that are able to hold the atmosphere and provide a living environment to the crew. In other words, the space station does not provide only a single interior space, but two or more independently sealed compartments within the interior space and encircled by the housing of the space station.

The inner chamber provides an additional space that is located in the housing, wherein the inner chamber encircles an inner cavity that can be sealed against the interior space of the housing and the compartments in the housing. Thus, the inner cavity can be used by the crew as a retreat in case of external threats. In case of high-energy radiation, the crew moves into the inner cavity. Thus, the crew is protected from the external radiation by the outer walls of the housing and by the walls of the inner chamber, thereby increasing the level of protection for the human crew.

The inner chamber adjoins each of the at least two compartments. Openings are provided in the wall of the inner chamber such that at least one opening enables access from the inner cavity to one of the compartments, respectively. Thus, the crew can access the inner cavity from each of the compartments and can leave the inner cavity into each other compartment. In other words, the inner cavity is a common floor or corridor that is accessible from each of the compartments, wherein the inner cavity can be sealed against each compartment. In case of damage or danger in one of the compartments, the crew can leave that compartment into the inner cavity through the respective opening. Once the crew is in the inner cavity, the inner cavity is sealed against the damaged compartment. The crew can now either be in the inner cavity for a certain time or can leave the inner cavity into another compartment through the respective opening and seal this another compartment against the inner cavity.

The space station described herein provides multiple interior space that are sealed against each other or can be sealed against each other so that the crew is able to move from one of these interior spaces into each other interior space through the inner cavity. Thus, it is not required to provide multiple modules that are connected to each other, because multiple separated rooms are provided within the housing of the same space station to protect the crew in case of damage or danger. Each of the compartments may include a minimum set of required life-supporting systems so that each compartment is prepared to be operated at least with regard to the life-supporting systems in an autonomous manner from the other compartments.

The space station design described herein particularly makes use of a continuous shell surface (the shell surface may include some openings or windows) with all compartments being located inside the space stations. It is not required to interconnect multiple modules in order to provide separate rooms that allow for the crew to evade damage or danger. In case of damage or danger, the crew moves from one compartment to the other compartment through the inner cavity. The openings that enable access to the inner cavity of the inner chamber are closable by doors or covers that may be made of the same material that is used for the wall of the inner chamber. The doors/covers are designed to withstand mechanical and thermal loads, like the wall of the inner chamber does.

According to an embodiment, the housing comprises a metal material and/or a metal alloy.

Generally, metal material or metal alloys provide high resistance to mechanical stress (like loss of pressure/atmosphere, meteorite impact), thermal loads (fire in the space station, sun radiation), and high-energetic radiation, etc. Therefore, a high level of protection can be obtained by the housing that comprises or is made of metal material and/or metal alloy.

For example, the outer surface and/or the first axial end face and/or the second axial end face comprise stainless steel or aluminum. Other metal materials or alloys may be used to form the outer surface and/or the axial end faces, or parts of the outer surface and/or the axial end faces. Preferably, the outer surface and/or the first axial end face and/or the second axial end face are entirely made of the metal material or metal alloy.

This design of the space station allows for being integrally built up on earth before the space station is being transported into outer space. In other words, the space station is not assembled in outer space nor is it required to equip the space station with devices and instruments in outer space because these assembly steps are performed prior to the transport phase into outer space.

Furthermore, a metal material or metal alloy provide a high level of protection against external threats in outer space, like high-energetic radiation and/or particle impact onto the space station.

According to a further embodiment, the wall of the inner chamber comprises a metal material and/or a metal alloy.

The wall of the inner chamber is made at least partially or completely from metal or metal alloy like stainless steel or aluminum or other metal materials. Thus, when the crew is in the inner chamber, at least two walls protect the crew from external threats, i.e., the outer wall of the housing and the wall of the inner chamber.

Furthermore, as the wall of the inner chamber is made of metal material or metal alloys, it provides a high level of protection against danger from a damaged compartment.

According to a further embodiment, the at least one bulkhead comprises a metal material and/or a metal alloy.

The at least one bulkhead is made at least partially or completely from metal or metal alloy like stainless steel or aluminum or other metal materials. Thus, when one of the compartments is damaged, the bulkhead protects the adjacent compartment(s) from the damaged compartment because the metal material or metal alloy is able to resist mechanical and thermal loads.

Additionally or alternatively, the bulkheads may include or may be made of carbon material or fiber composite components.

Generally, the housing with its surfaces, the inner chamber, and the bulkheads may be made of metal material. Thus, the structure of the space station is made of metal material and provides high resistance against loads. Multiple compartments are provided inside the housing. These multiple compartments are separated from and sealed/sealable against each other. As the structure of the space station is made of metal material and/or metal alloys, the individual compartments and the inner cavity are protected from damage and/or danger in one of the other compartments.

According to a further embodiment, the at least one bulkhead extends in a radial direction of the housing.

Thus, the bulkhead partitions the interior space of the housing into multiple compartments that adjoin each other along the longitudinal direction. However, it is also conceivable that longitudinally extending bulkheads are used to partition one of the compartments into sub-compartments.

According to a further embodiment, the inner chamber extends along the longitudinal axis of the housing from the first axial end face to the second axial end face.

The inner chamber thus extends along the entire length of the housing from one axial end to the other axial end.

Docking ports and/or hatches may be located at the first and/or second axial end face so that crew members may enter the inner cavity through the hatches at the axial ends and access each compartment of the space station through the inner cavity.

According to a further embodiment, the multiple openings in the wall of the inner chamber are arranged with an offset to each other along a circumferential direction of the wall.

In longitudinal direction of the housing, i.e., along the longitudinal axis of the housing, the openings are arranged one above the other with a certain distance in between. Each opening enables access to one of the compartments. However, the openings are offset with respect to one another along the circumferential direction. This design feature avoids weakening of the mechanical resistance of the wall of the inner chamber because the openings in the wall are not arranged in a linear manner along the longitudinal axis, but with a circumferential offset.

According to a further embodiment, each of the multiple openings in the wall of the inner chamber includes a door that is configured to seal the inner cavity from the respective compartment.

Especially, the doors are designed in accordance with the principles of known sealing doors or covers for space stations configured for outer space missions.

According to a further embodiment, the outer surface of the housing comprises at least one recess that can be selectively opened or closed.

This recess can be used to access the compartment from the external environment of the space station. For example, the recess is a docking port or a window. In case the inner cavity cannot be accesses from one of the compartments, the crew members in that compartment can leave the compartment through the recess in the outer surface once a rescue or escape capsule is coupled to the recess.

The outer surface of the housing may include multiple such recesses. In particular, at least one such recess is located in the outer surface and assigned to each compartment.

Thus, in case of damage to the space station or one of the compartments, there exist two ways to leave a compartment: via the opening into the inner chamber (and further into another compartment or out of the space station through the axial openings of the inner chamber) or via the recess into a rescue or escape capsule.

According to a further embodiment, the housing is cylindrically shaped.

With the housing being cylindrically shaped, the space station may be assembled on earth and conveyed with a carrier vehicle into an orbit of the earth. The cylindrical shape is particularly suitable for such a transport phase.

However, it should be noted that the housing of the space station may be of any other shape.

According to a further embodiment, the inner chamber is cylindrically shaped.

The compartments circularly surround the inner chamber and are arranged one above the other along the longitudinal axis of the housing.

According to a further embodiment, the inner chamber is located in the center of the housing. For example, the inner chamber is equidistant from the outer wall of the housing. In particular, the inner chamber and the housing are coaxial and have coinciding central longitudinal axes. The inner chamber preferably extends linearly between the two axial end faces of the space station.

Equipment and devices may be stored at an inner surface of the outer wall of the housing. The equipment and devices may serve as an additional protection from external impacts.

However, it should be noted that the inner chamber may be of any other shape.

According to a further embodiment, the first axial end face is conically shaped with a central region of the first axial end face protruding outwardly with respect to the interior space of the housing.

The first axial end face is conically shaped to increase the rigidity of the space station's structure. Like the first axial end face, the second axial end face may also be conically shaped and protrude outwardly with respect to the interior space of the housing. Thus, the length of the inner chamber along the longitudinal direction is greater than the length of the outer surface of the housing in the longitudinal direction.

According to a further embodiment, the space station comprises a reinforcing element that is located at an end section of the inner chamber adjacent to the first axial end face and/or adjacent to the second axial end face.

The reinforcing element may contribute to the rigidity of the space station and provides additional protection of the end section(s) of the inner chamber against external impacts.

According to a further embodiment, the reinforcing element circumferentially surrounds the inner chamber.

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
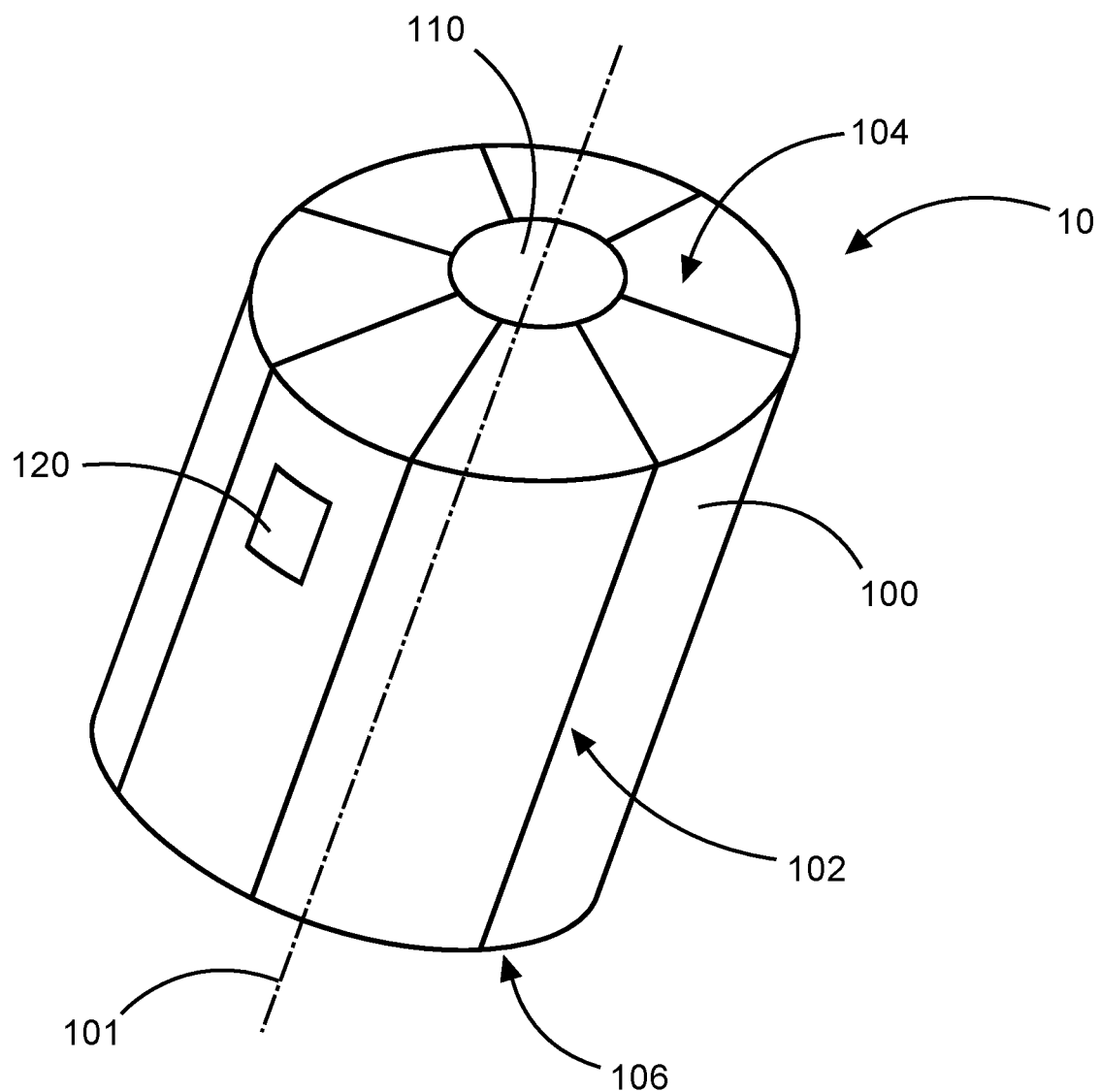
FIG. 1 is a schematic representation of a space station.

The following detailed description is merely exemplary in nature and is not intended to limit the invention and uses of the invention. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 schematically shows a space station 10. The space station 10 comprises a housing 100 with an outer surface 102, a first axial end face 104, and a second axial end face 106. The space station 10 generally has a cylindrical shape with a longitudinal axis 101. However, the end faces 104, 106 may conically protrude outwardly such that the central region of the end faces 104, 106 protrude from the interior space encircled by the housing 100.

A recess 120 is shown in the outer surface 102. While a single recess 120 is shown, it should be understood that multiple such recesses 120 may be part of the outer surface 102. The recess 120 is closed by a door or cover when the space station is operative in outer space. However, the door or cover may be removable such that the recess 120 can be used for docking an external capsule to the space station 10 and crew members may enter or leave the space station 10 through the recess 120. Furthermore, the recess 120 may be used for transportation of equipment of the space station 10.

Figure 2:
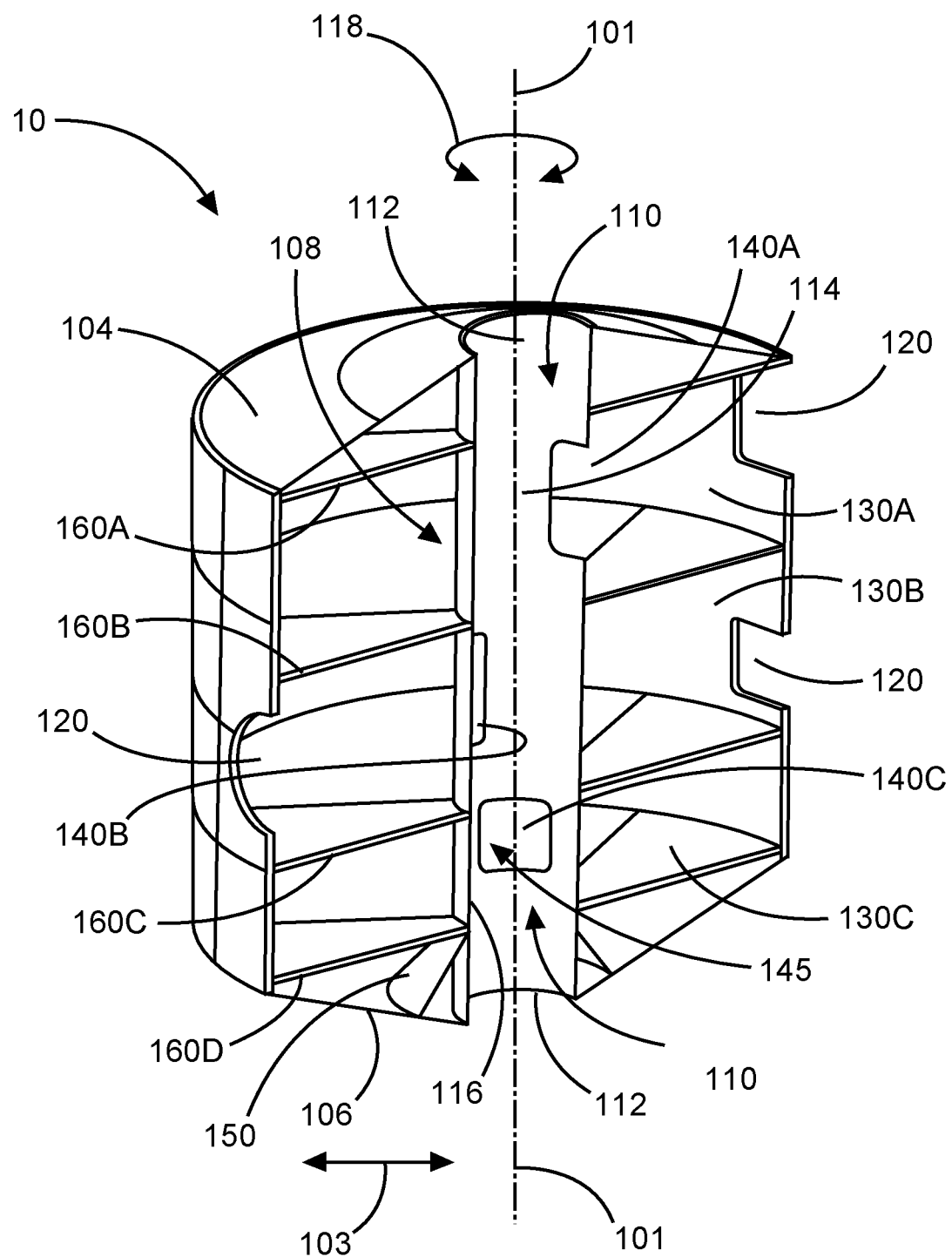
FIG. 2 is another schematic representation of a sectional view of a space station.

FIG. 2 shows a detailed cross sectional view of the space station 10. The space station 10 is cylindrically shaped with a longitudinal axis 101 and a radial direction 103. The space station comprises a housing 100, a first axial end face 104, and a second axial end face 106. The end faces are arranged opposite to each other. The interior space 108 is encircled by the outer surface 102 and the axial end faces 104, 106.

The interior space 108 is partitioned into multiple compartments 130A, 130B, 130C by bulkheads 160A, 160B, 160C, 160D. While three compartments are shown in FIG. 2, is should be understood that this number of compartments is shown by way of example only and that more or less compartments may be provided in a space station that is designed in accordance with the principles described herein. Each compartment may be referred to as a longitudinal section of the interior space 108, because the bulkheads 160A, 160B, 160C, 160D extend in the radial direction and built up compartments that are sealed from each other and have a limited extension in the direction along the longitudinal axis 101.

The inner chamber 110 is located in the center of the interior space 108 and extends linearly along the longitudinal axis 101 from the first axial end face 104 to the second axial end face 106. Docking ports 112 are arranged at the first and second end faces 104, 106, to access the inner cavity 114 of the inner chamber 110 from a vehicle that has docked to one of the docking ports 112. The docking ports 112 may be sealed by a cover against the environment of the space station so that the inner cavity 114 can be provided with an atmosphere for the crew members.

The inner cavity 114 is surrounded by a wall 116 that separates the inner cavity 114 from the compartments 130A, 130B, 130C. However, in order to access the compartments from the inner cavity (or vice-versa), openings 140A, 140B, 140C are provided in the wall 116. These openings 140A, 140B, 140C can be selectively opened or closed by a respective door 145 to seal the inner cavity 114 from the compartments 130A, 130B, 130C.

For example, a crew member is located in the compartment 130C and wants to access the compartment 130A. In that case, the crew member leaves the compartment 130C through the opening 140C into the inner cavity 114. The door of the opening 140C may be closed and sealed. The crew member moves in the inner cavity 114 to the opening 140A of the compartment 130A, opens the respective door and enters the compartment 130A. The door of the opening 140A may be closed.

The compartments 130A, 130B, 130C are hermetically sealed from each other when the doors of the openings in the wall of the inner chamber are closed. Furthermore, the bulkheads 160A, 160B, 160C, 160D separate adjacent compartments and provide a certain level of protection against damage and danger.

Furthermore, the crew members may leave all compartments and stay in the inner chamber for a certain time, for example during high-energetic radiation occurrences in outer space. In that scenario, the crew members are protected by the outer wall of the housing and the wall of the inner chamber.

Each compartment is assigned a recess 120 in the outer surface 102 of the housing. The recess 120 can be selectively opened or closed to allow a crew member or equipment to enter or leave the space station. The recess 120 may also be designed as a window. Each of the compartments is an open space and allows a crew member to access the entire compartment in a circumferential direction 118 of the space station 10.

A reinforcing element 150 is shown between the bulkhead 160D and the second axial end face 106. The reinforcing element 150 is arranged at an axial end section of the inner chamber 110. Such a reinforcing element may also be arranged between the bulkhead 160A and the first axial end face 104 at an opposite axial end section of the inner chamber 110. The reinforcing element 150 has a conical shape and widens towards the end faces 104, 106.

As can be seen from the representation in FIG. 2, the openings 140A, 140B, 140C are arranged at different circumferential positions along the circumferential direction 118 of the wall 116 of the inner chamber 110. For example, the opening 140B is at a different angular position along the circumferential direction 118 of the wall 116 compared to the opening 140A and the opening 140C. Thus, the wall 116 still has a high mechanical strength although multiple openings 140A, 140B, 140C are provided therein.

In one example and without limitation, the housing 110 has a diameter of about 8 meters and the inner chamber has a diameter of 1.5 to 2 meters. The height of one compartment along the longitudinal axis 101 is about 2 to 2.5 meters.

Other use cases of the space station are described in the following.

In one example, the space station 10 is made of metallic materials. The outer cylinder (outer surface 102 of the housing 100) and inner cylinder (wall 116 of the inner chamber 110) are made from metal material like stainless steel or aluminum, with bolted flanges to support integration of berthing and/or docking ports and windows (docking port 112, recess 120). The pressure-tight bulkheads 160A, 160B, 160C, 160D are metallic or Carbon-Fiber Reinforced Plastics (CFRP).

In particular, the space station 10 is pressurized and heated to provide a shirt-sleeve environment for the crew.

In particular, the space station is separated into floor levels (compartments 130A, 130B, 130C) extending across the radius of the cylinder that forms the housing 100. Floor levels are separated by pressure-tight bulkheads 160A, 160B, 160C, 160D that act as floor/ceiling for each compartment. Transition between the floor levels is exclusively through the inner chamber 110, which includes openings 140A, 140B, 140C and corresponding hatches 145 on each floor level.

The inner chamber 110 may serve as main load carrying element during launch, the primary structural interface to the launcher is located on the lower side and represented by the docking port 112 at the second axial end face 106, and an additional module can be mounted on top of the structure at the docking port 112 at the first axial end face 104.

Protrusions and openings 140A, 140B, 140B in the wall 116 of the inner chamber 110 (hatches) are located such as to minimize interruptions to the primary load path from the second axial end face 106 to the first axial end face 104 along the longitudinal axis 101.

The outer surface 102 provides pressure containment, stiffness and a secondary load path during launch; the end faces 104, 106 of the housing are conically shaped and canted to reduce stresses under pressure loading. Buckling may be controlled by internal pressure and by reinforcing the wall plates of the wall 102 of the housing with forged metallic stringers and stiffeners. Load transfer between primary and secondary load path (wall of inner chamber and wall of housing) is achieved by stiffening elements.

Berthing and/or docking ports 112 are located axially at each end of the structure. Such berthing and/or docking ports 112 can be accessed through the inner chamber. Such berthing and/or docking ports allow for extension of the space station by additional modules, rendezvous and docking of visiting spacecraft and for ingress/egress to space (airlock). The port 112 at the second axial end face 106 of the structure is configured to interface a launcher and may be realized by using the Common Berthing Mechanism (CBM), which facilitates berthing of standards used in spacecraft technology, like HTV, Dragon Cargo, Cygnus and allows extension of the space station by additional modules.

Additional berthing and/or docking ports 120 are located radially on the outer surface 102 of the housing 100. Such berthing and/or docking ports 120 can be accessed through the individual floor levels. The radial ports 120 may be realized using the International Docking System Standard (IDSS) and can thus make use of the NASA Docking System or the International berthing and Docking Mechanism (IBDM). This standard may facilitate berthing and/or docking of the Dragon 2, Dream Chaser or other future spacecraft.

The space station 10 can be extended by adding additional modules that are docket to the berthing and/or docking ports 112, 120. The space station 10 can be serviced and maintained by visiting spacecraft that rendezvous and dock to the berthing and/or docking ports 112, 120.

The space station 10 controls the main catastrophic hazards in human spaceflight (radiation, depressurization, fire) by the combination of material choice and architecture: The metallic structure, for example stainless steel or aluminum, provides an inherently high level of passive radiation shielding. In the event of solar outbursts, generating excessive levels of radiation, the crew can escape into the inner chamber 110, which provides additional passive shielding by the wall 116. The metallic main structure provides high tolerance and resistance to excessive heat generated by a fire hazard. The compartments 130A, 130B, 130C can be hermetically sealed off from each other by closing the ingress/egress hatches 140A, 140B, 140C on the inner chamber 110. This allows astronauts to escape to a safe floor level (to another compartment) as well as to the inner chamber 110 itself in the event of a depressurization or fire. In the event of fire and to extinguish fire and prevent flame propagation, air can be intentionally released from the affected section after it being sealed off, or inert gas can be pumped into that section. Each floor level may provide an independent and sufficient level of life-support capability to ensure survival of the crew until a rescue spacecraft is ready for evacuation or until the part of the space station impacted by a safety hazard is repaired. The crew can escape from the space station by always maintaining free access to berthing and/or docking ports 112, 120, to which a rescue spacecraft can dock.

The space station 10 may support transfer from the pressurized internal volume to space for cargo or crew by using one berthing and/or docking port 112, 120 as ingress/egress. To that purpose, one floor level 130A, 130B, 130C or the inner cavity 114 of the inner chamber 110 can be sealed off from the rest of the space station to serve as an airlock.

The space station 10 provides interfaces for implementing windows of large dimension radially on the outer cylinder surface. For example, windows may be implemented in a recess 120 in the outer surface 102 of the housing 100.

The space station 10 may provide interfaces for accommodating grapple fixtures on the outer surface 102 to support extra-vehicular robotics.

The space station 10 may provide interfaces for accommodating payloads on the outer surface 102; such payloads can be oriented in Nadir, Zenith or Ram direction, depending on the nature of science or application to be conducted.

The space station 10 may provide interfaces for thermal control elements (radiators, insulation) to be accommodated on the outer surface 102 of the housing 100.

The floor level separation and capability to segregate compartments 130A, 130B, 130C provides a high level of privacy and confidentiality for the crew as well as for sensitive (e.g., classified) applications and payloads.

The space station 10 may have a large diameter to allow to accommodate an equally large diameter centrifuge to generate artificial gravity.

Based on the features above, the space station 10 may provide a unique architecture which merges the functions of habitat, laboratory, node, airlock, docking port in one single element; compared to a space station where each such function is allocated in one specific module or element to be launched separately and assembled in-orbit. The space station 10 thus enables an entire space station to be transported to orbit in a single launch and to thus become immediately operational after commissioning.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It will be understood that various changes may be made in the function and arrangement of elements described in an exemplary embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 space station
100 housing
101 longitudinal axis
102 outer surface
103 radial direction
104 first axial end face
106 second axial end face
108 interior space
110 inner chamber
112 docking port, hatch
114 inner cavity
116 wall
118 circumferential direction
120 recess
130 compartment, floor level
140 opening in the wall of the inner chamber
145 door
150 reinforcing element
160 radial bulkhead

The invention claimed is:

1. A space station for manned outer space missions, the space station comprising:
   a housing forming an interior space sealable against an external surrounding environment of the housing;
   at least one bulkhead arranged within the housing; and
   an inner chamber arranged within the housing;
   wherein the housing comprises an outer surface, a first axial end face, and a second axial end face;
   wherein the first axial end face is arranged opposite the second axial end face, and the outer surface extends from the first axial end face to the second axial end face along a longitudinal axis of the housing;
   wherein the inner chamber extends along the longitudinal axis of the housing from the first axial end face to the second axial end face,
   wherein the at least one bulkhead is arranged in the housing such that the at least one bulkhead partitions the interior space into at least first and second compartments that are sealed from each other by the at least one bulkhead;
   wherein the inner chamber comprises a wall encircling an inner cavity, and the inner chamber extends within the housing such that the inner chamber adjoins each of the at least first and second compartments;
   wherein the wall of the inner chamber comprises a plurality of openings, wherein at least one opening of the plurality of openings is assigned to each of the at least first and second compartments, respectively, and wherein each opening of the plurality of openings is sealable against the respective one of the at least first and second compartments, wherein a first docking port to the inner chamber is arranged at the first end face, and a second docking port to the inner chamber is arranged at the second end face, and the first and second docking ports are configured to grant access to the inner cavity of the inner chamber from a vehicle that has docked to one of the first or second docking ports, wherein the second docking port is configured to interface a launcher, wherein the inner chamber is configured to serve as a main load carrying element during launch, with the second docking port being a primary structural interface to the launcher and the first docking port being configured for mounting an additional module, wherein the inner chamber is arranged in the interior space formed by the housing, wherein the at least first and second compartments are axial segments of the space station arranged in a longitudinal direction between the first axial end face and the second axial end face, wherein the first compartment is closer to the first axial end face than the second compartment, and the second compartment is closer to the second end face than the first compartment, wherein the at least one bulkhead extends from the wall of the inner chamber to an inner surface of a wall of the housing, and wherein each of the at least first and second compartments circumferentially surrounds the entirety of the inner chamber.

2. The space station of claim 1, wherein the housing comprises a metal material and/or a metal alloy.

3. The space station of claim 1, wherein the wall of the inner chamber comprises a metal material and/or a metal alloy.

4. The space station of claim 1, wherein the at least one bulkhead comprises a metal material and/or a metal alloy.

5. The space station of claim 1, wherein the at least one bulkhead extends in a radial direction of the housing.

6. The space station of claim 1, wherein the plurality of openings in the wall of the inner chamber are arranged with an offset to each other along a circumferential direction of the wall.

7. The space station of claim 1, wherein each of the plurality of openings in the wall of the inner chamber includes a door configured to seal the inner cavity from the respective compartment.

8. The space station of claim 1, wherein the outer surface of the housing comprises at least one recess configured to be selectively opened or closed.

9. The space station of claim 1, wherein the housing is cylindrically shaped.

10. The space station of claim 1, wherein the inner chamber is cylindrically shaped.

11. The space station of claim 1, wherein the inner chamber is located in a center of the housing.

12. The space station of claim 1, wherein the first axial end face is conically shaped with a central region of the first axial end face protruding outwardly with respect to the interior space of the housing.

13. The space station of claim 1, wherein the space station comprises a reinforcing element located at an end section of the inner chamber adjacent to the first axial end face and/or adjacent to the second axial end face.

14. The space station of claim 13, wherein the reinforcing element circumferentially surrounds the inner chamber.

* * * * *